United States Patent [19]
Kitajima

[11] Patent Number: 5,278,748
[45] Date of Patent: Jan. 11, 1994

[54] VOLTAGE-RESONANT DC-DC CONVERTER

[75] Inventor: Tokimune Kitajima, Tokyo, Japan

[73] Assignee: NEC Corporation, Tokyo, Japan

[21] Appl. No.: 910,790

[22] Filed: Jul. 8, 1992

[30] Foreign Application Priority Data

| Jul. 12, 1991 | [JP] | Japan | 3-172703 |
| Jul. 30, 1991 | [JP] | Japan | 3-211400 |
| Jul. 30, 1991 | [JP] | Japan | 3-211401 |

[51] Int. Cl.⁵ .................................... H02H 7/122
[52] U.S. Cl. .................................. 363/56; 363/21
[58] Field of Search ............ 363/21, 16, 17, 20, 363/97, 98, 131, 132, 56, 58; 361/91, 111

[56] References Cited

U.S. PATENT DOCUMENTS

| 4,366,522 | 12/1982 | Baker | 361/91 |
| 5,055,991 | 10/1991 | Carroll et al. | 363/56 |
| 5,132,889 | 7/1992 | Hitchcock et al. | 363/17 |

FOREIGN PATENT DOCUMENTS

0127882  10/1980  Japan ................ 363/20

OTHER PUBLICATIONS

H. S. Hoffman Jr., Switching Regulator with Dual-Switches and Dual Clamp Circuits. IBM Technical Disclosure Bulletin, vol. 17, No. 7, Dec. 1974.
T. Ninomiya et al., Comparative Study of Voltage-Mode Resonant Converters with Transformer, IEICE Technical Report, vol. 99 No. 439 Feb. 16, 1991.

*Primary Examiner*—Steven L. Stephan
*Assistant Examiner*—Adolf Berhane
*Attorney, Agent, or Firm*—Whitham & Marhoefer

[57] ABSTRACT

A voltage-resonant DC-DC forward converter is provided with a snubber circuit in its secondary circuit. The snubber circuit comprises a series connection of a first capacitor and a first diode connected to both ends of the secondary winding of the main transformer to make up a loop of a secondary resonance circuit which allows a secondary resonance current to flow in the forward direction of the first diode, the forward direction being so directed that the first diode blocks the secondary resonance current from flowing at least while the second winding supplies a current to the smoothing circuit through a second diode for rectifying the secondary current. The converter is further provided with a regulation circuit for regulating the output voltage of the converter. The circuit has a transistor for controlling switching of the output current which varies linearly with time. The transistor is controlled by the sum of the voltage signal indicative of the output current and of the deviation signal indicative of the deviation of the output voltage from a prescribed value. When the sum exceeds the base-emitter threshold voltage, the transistor is turned on to switch off the output current.

12 Claims, 10 Drawing Sheets

$$E_2 = \frac{n_2}{n_1}E, \quad C_{P2} = \left(\frac{n_1}{n_2}\right)^2 C_P, \quad L_{P2} = \left(\frac{n_2}{n_1}\right)^2 L_P$$

VOLTAGE-RESONANT DC-DC CONVERTER

BACKGROUND OF THE INVENTION

1. Field of the Invention

This invention relates to a voltage-resonant DC-DC converter, and in particular to an improvement in the power-loss characteristic of the primary switch and the output-regulation characteristics of multiple output circuits provided in the converter.

2. Description of the Related Art

It is well known in the art that a turn-on loss in a DC-DC converter is markedly reduced by applying the zero-volt switching (ZVS) method to the voltage-resonant converter, and thus the converter of this type is now further developed in order to attain high efficiency at high frequency.

FIG. 1 represents a circuit of a typical single-ended voltage-resonant forward converter. The circuit is made up of DC power source 1, transformer 5, primary switch 3, resonance capacitor 4 connected in parallel with primary switch 3, voltage-clamping circuit 70, rectifier diode 11, current snubber circuit 71, input condenser 2, output condenser 12 and loop-control circuit 14 for controlling switching of primary switch 3. In the figure, inductor 15 represents a leakage inductance of transformer 5 and an inductance of an externally attached inductive element if required.

Both primary switch 3 and capacitor 4 are connected in series with primary winding 6 of transformer 5. Primary switch 3 driven under control of loop control circuit 14, controls the output of the converter. Capacitor 4, associated with a leakage inductance of primary winding 6, i.e. self-inductance $L_P$ of primary winding 6, constitutes a series resonance circuit, and provides primary switch 3 with zero voltage on turning-on of the switch (the E-class switching mode). In this way power loss produced on turning-on primary switch 3 (a turn-on power loss) is reduced.

Voltage clamping circuit 70 is provided for resetting a magnetic energy stored in the magnetic core of transformer 5 during the turn-on period, in order to prevent the core from being magnetically saturated. The circuit is made up of a diode, a resistor and a capacitor interconnected in parallel, and connected in parallel with primary winding 6. The magnetic energy stored in the core of transformer 5 is dissipated by the resistor. The capacitor in the circuit is intended for absorbing any surge voltage produced at the time of turn-off. Current snubber circuit 71 is also intended for shunting a surge current induced by leakage inductance 15 at the time of turn-off in order to protect diode 11 from over-current damage. The circuit is made up of a resistor and a capacitor interconnected in series. The resistor dissipates part of the current energy while the capacitor smoothes the current.

In operation, when primary switch 3 is turned off, the resonance current starts flowing and voltage $V_{DS}$ across the primary switch begins to rise beginning with zero volts. When half a resonance cycle has elapsed and voltage $V_{DS}$ returns to zero volts, loop-control circuit 14 forces primary switch 3 to turn on. In this way, turn-on loss is avoided. The turn-on period is basically controlled to be proportional to the desired value of output voltage $V_O$ of the converter and, when a deviation of output voltage $V_O$ from the desired value is present, the turn-on period is controlled to compensate for the deviation.

FIG. 2 represents a circuit of a typical single-ended voltage-resonant forward converter provided with multiple outputs. For simplicity, a main output circuit 72 and only one auxiliary output circuit 73 are shown in the figure. The highest power output is usually selected as the main output, which is controlled by means of the voltage-resonant switching of the primary switch. In order to avoid an adverse effect exerted on the auxiliary output by the control of the main output, each auxiliary output circuit has its own output regulation circuit.

The converter provided with the voltage-resonant switching circuit and main output circuit as shown in FIG. 2, is well-known (for example, cf. Power Engineering in Electronics and Communications, Vol. 90, No. 439, PE90-68).

Auxiliary output circuit 73 is supplied with an output of secondary winding 77 of transformer 5, and rectified by rectifier diode 11. Output voltage $V_O$ is controlled independently of main output circuit 72 by a common series dropper.

A problem encountered in the voltage-resonant DC-DC converter shown in FIG. 1, however, is that applying the resonant voltage to the primary switch inevitably involves applying a peak voltage across the switching element. Application of such a high voltage brings about voltage stress in the switching element. In order to avoid this voltage stress, it is required to use a so-called high-voltage switching element. A high-voltage switch, however, usually has high on-resistance, which causes an turn-on power loss, entailing low efficiency. Further, attaching voltage-clamping circuit 70 and current snubber circuit 71 not only brings about power losses in these circuits, but also careless use of these circuit causes the resonant voltage deform, thus allowing a turn-on loss in primary switch 3.

A problem encountered in the converter with multiple outputs is that, in order to compensate for possible variations in the input voltage of the auxiliary output circuit, it is necessary to provide in the auxiliary output circuit a series dropper having a high input voltage at the cost of a high power loss. Variations typically take place when the on-period and the switching frequency of primary switch 3 vary in response to variations of the load current or the input voltage in the main output circuit.

SUMMARY OF THE INVENTION

It is an object of the present invention to provide a voltage-resonant DC-DC converter provided with a snubber circuit which makes it possible to use a low-voltage low on-resistance primary switch and also to decrease the power loss both in the rectifier diode and in the snubber circuit.

It is another object of the present invention to provide a voltage-resonant DC-DC converter provided with multiple output circuits, at least one of which has an output regulation circuit with low power loss.

In order to attain the first object, the snubber means according to the present invention includes a series connection of a capacitor and a first diode connected to both ends of the secondary winding of the main transformer in the converter to make up a loop of a secondary resonance circuit which allows a secondary resonance current to flow in the forward direction of the first diode, the forward direction being so directed that the first diode blocks the secondary resonance current from flowing at least while the secondary winding supplies a secondary current to the smoothing circuit through a second diode for rectifying the secondary current.

While the secondary resonance current flows, the resonant voltage across the primary switch rises more slowly than it does when the secondary resonance current is blocked. Since the secondary resonance takes place nearly in the middle of the turn-off period, it follows that the resonant voltage varies slowly in that period. Thus, the resonant voltage takes a truncated sinewave form, whereby the primary switch is protected from being applied with the peak value of the sinewave voltage.

The resonance which takes place in the primary circuit while the secondary resonance current flows will be referred to below as the truncated primary resonance. The truncated primary resonance reacts on the secondary winding to produce an induced voltage which varies slowly in the middle of the turn-off period. This voltage is referred to below as the truncated secondary voltage. The truncated secondary voltage provides the rectifier diode in the secondary circuit with a smaller reverse voltage, which causes a smaller power loss of the reverse recovery current than the normal secondary voltage does.

In order to attain the second object above, the output regulation means according to the present invention comprises switching means for switching the secondary current of the main transformer, first switching control means for controlling the switching element to take a first switching state with a predetermined phase relation to the switching action of the primary switch, current-to-voltage converting means for generating a voltage signal, which varies as the secondary current, comparator means for providing a deviation signal corresponding to a deviation of the output voltage of the output circuit from a prescribed value, and second switching control means for controlling the switching means to take a second switching state when an absolute value of the difference between the existing voltage signal and the first voltage signal varies beyond a threshold value which is dependent on the deviation signal, the first voltage signal being a voltage signal generated when the switching means goes to the first switching state. Hereafter, the absolute value above is referred to as an absolute value signal.

In a DC-DC converter, the secondary current which flows in every switching period in the secondary circuit through the rectifier diode varies as a monotone function of time. Therefore, the value of the secondary current at a given instant corresponds to a time or a phase in the switching period. This makes it possible to assign a time or phase to a current value. Accordingly, switch-on or -off at a given current value or at a given voltage signal involves switch-on or -off at a corresponding time or phase. It follows that, if $t_1$ and $t_2$ denote the times when the switching means goes respectively to the first switching state and to the second switching state, then the absolute value of the difference between the voltage signals $V_1$ at $t_1$ and $V_2$ at $t_2$ corresponds to the period that the secondary current is supplied to the load. Since the secondary current should be supplied for a short time in the case that the existing output voltage of the output circuit is higher than the prescribed value, i.e. in the case that the deviation is large, the absolute value of the difference of the two voltage signals $V_1$ and $V_2$, which is the threshold value of the absolute value signal, should be small for the large deviation. In order to accord with this relation between the threshold value and the deviation signal, it is necessary that the threshold value is a decreasing function of the deviation signal. This requirement is met when the sum of the threshold value and the deviation signal is equal to a predetermined constant.

The above and other objects, features, and advantages of the present invention will become apparent from the following description referring to the accompanying drawings which illustrate examples of preferred embodiments of the present invention.

BRIEF DESCRIPTION OF THE DRAWINGS

FIG. 10 is provided in the auxiliary output circuit.

DETAILED DESCRIPTION OF PREFERRED EMBODIMENT

Figure 1:
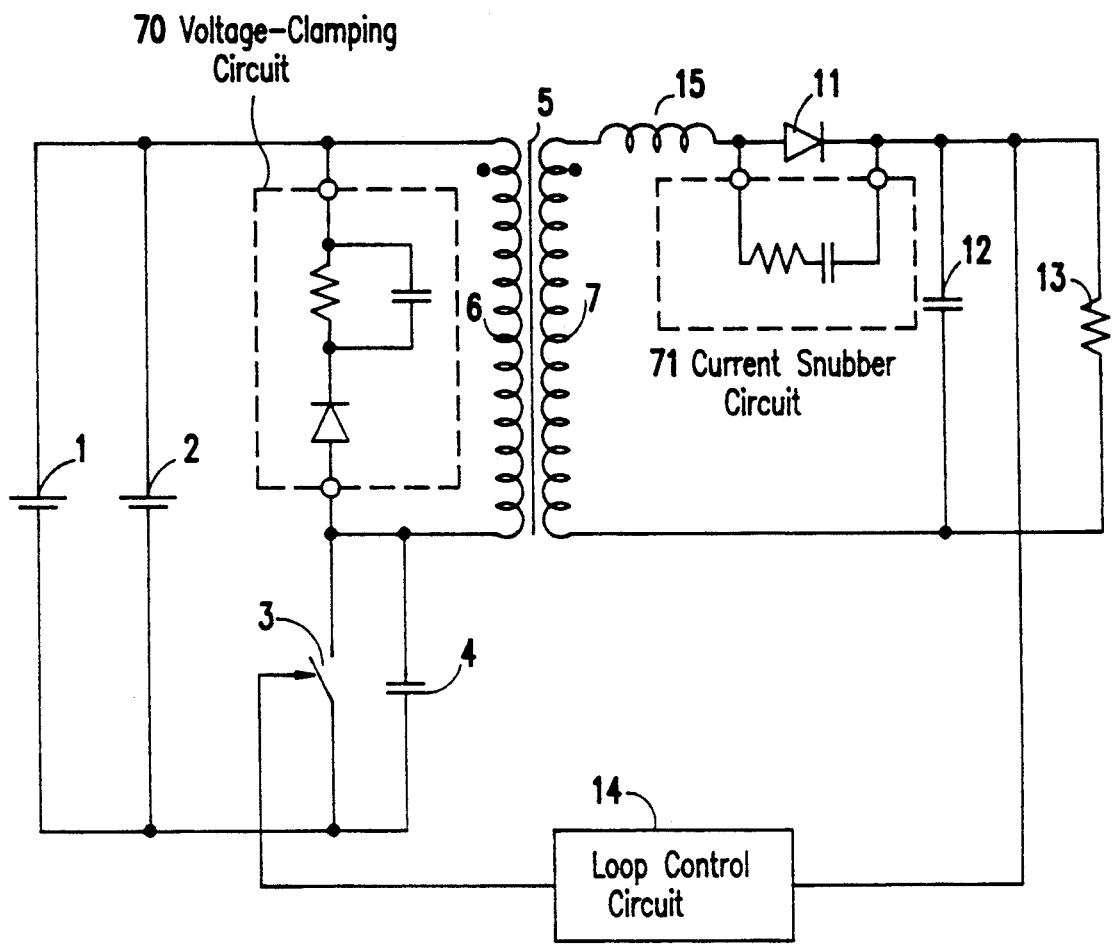
FIG. 1 shows a circuit of a single-ended voltage-resonant forward converter according to the prior art.
Figure 2:
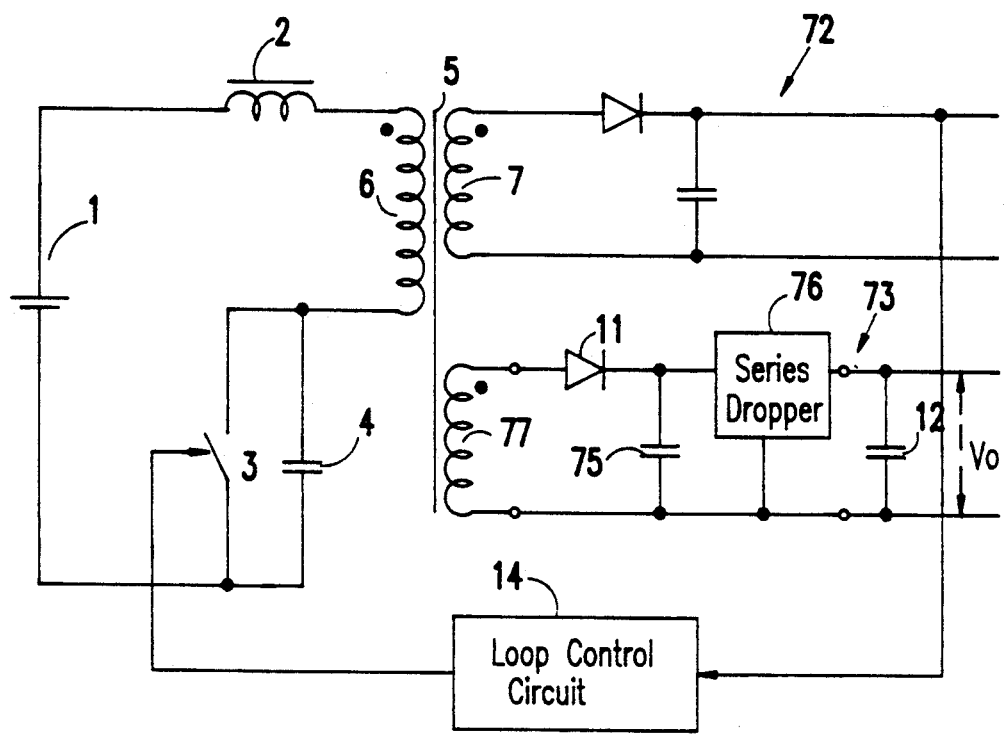
FIG. 2 shows a circuit of a single-ended voltage-resonant forward converter provided with multiple outputs.
Figure 3:
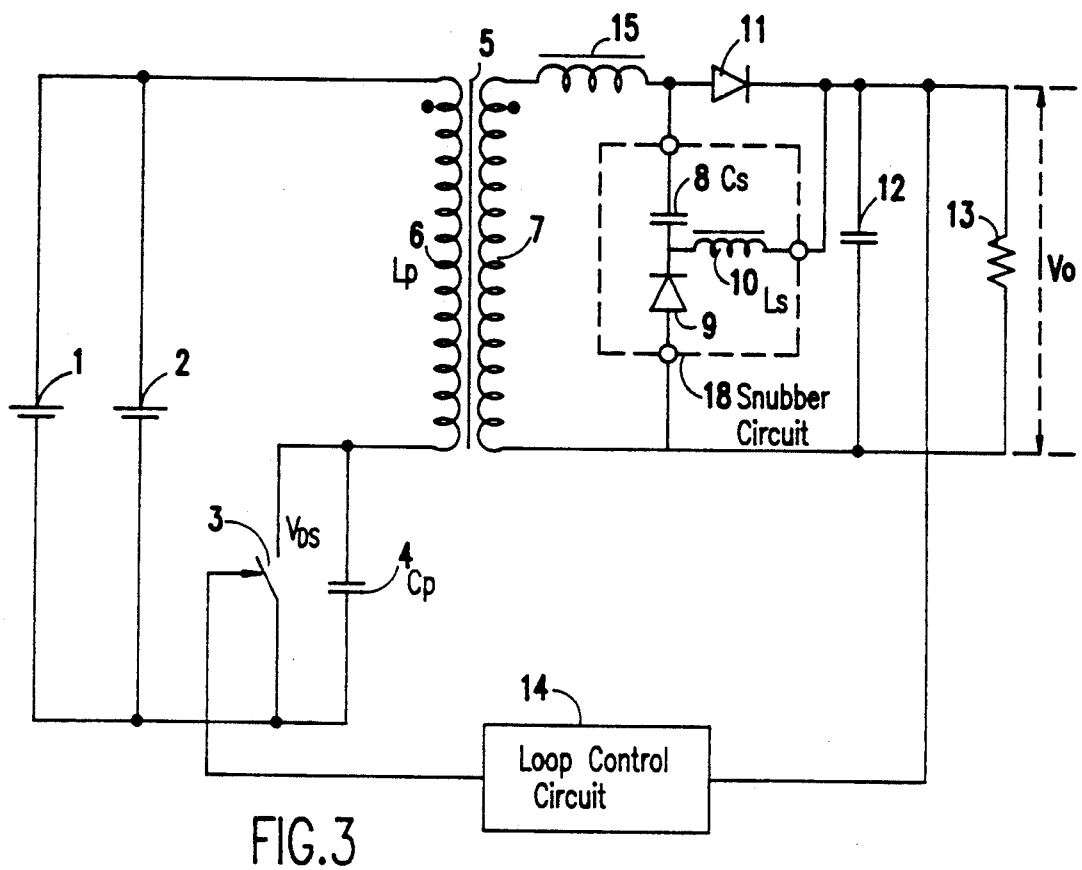
FIG. 3 shows a voltage-resonant DC-DC forward converter provided with a snubber circuit according to the present invention.
Figure 5:
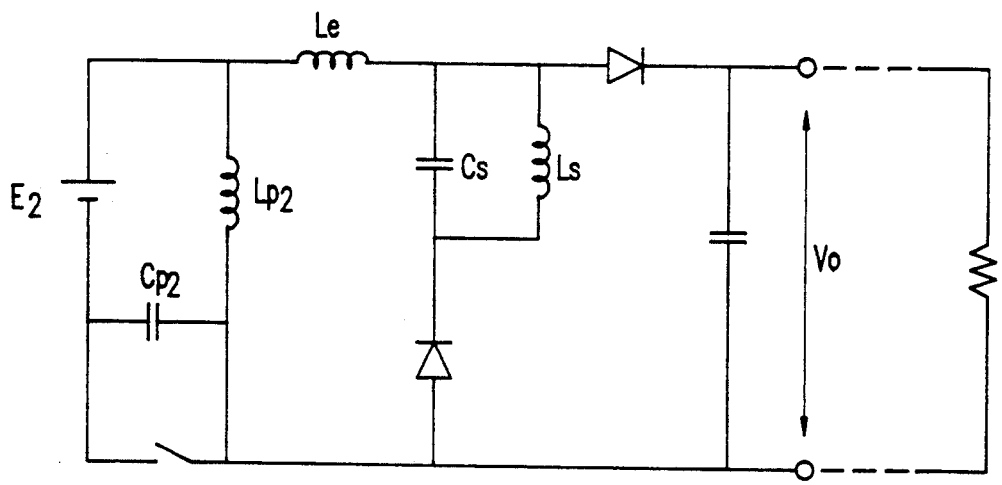
FIG. 5 shows an equivalent circuit of the snubber circuit shown in FIG. 3, in which the primary circuit is reduced to the secondary circuit.

Referring now to FIGS. 3, 4 and 5, a first embodiment of the present invention will be given below. FIG. 3 shows a voltage-resonant DC-DC forward converter provided with a snubber circuit according to the present invention. Since the main part of the converter is identical with that already described with reference to FIG. 1, the explanation of the part per se will be omitted. The snubber circuit of the present invention is made up of capacitor 8, diode 9 interconnected in series and inductor 10. Both ends of the series connection are coupled to both ends of secondary winding 7 of main transformer 5 so as to constitute a resonance circuit. Hereafter the resonance circuit is referred to as the secondary resonance circuit. The forward direction of diode 9 is so directed that diode 9 blocks the secondary resonance current while the secondary winding supplies a secondary current to smoothing circuit 12 through rectifier diode 11. Inductor 10 is connected between the cathode of rectifier diode 11 and the junction of capacitor 8 and diode 9, thereby making a discharge path of an electric charge stored in capacitor 8. The discharge is carried out while diode 9 is off. Inductor 15 represents the leakage inductance of transformer 5 and the inductance of any added desired inductor, if necessary.

The capacitance of capacitor 8 is determined in order to slow the rise and to lower the peak of the reasonace voltage to be applied to primary switch 3 when the switch is turned off. The inductance of inductor 10 is determined to be large enough to be able to obviate ripple production in the output of the converter and small enough to be able to substantially reset capacitor 8 before the next cycle of the voltage-resonant switching begins. Thus, the inductance of inductor 10 is preferably such that the time constant associated with the capacitance and inductance of capacitor 8 and inductor 10, respectively, is of an order of the average period of the voltage-resonant switching.

Figure 4A:
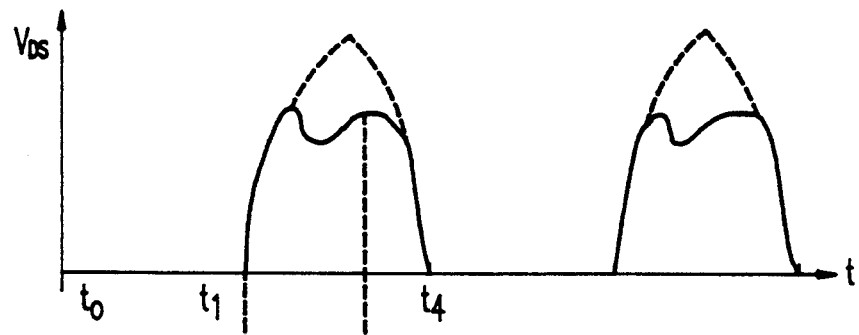
FIGS. 4(a)–(e) shows time charts of the signals generated in various parts of the snubber circuit of FIG. 3.
Figure 4B:
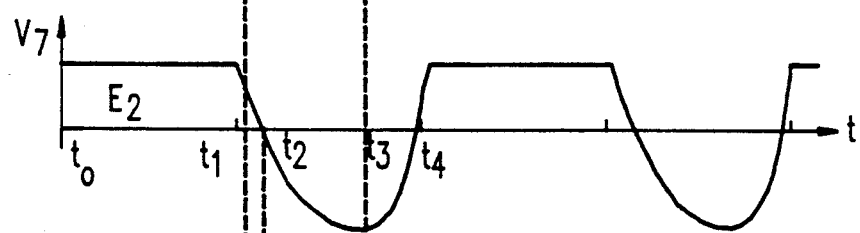
Figure 4C:
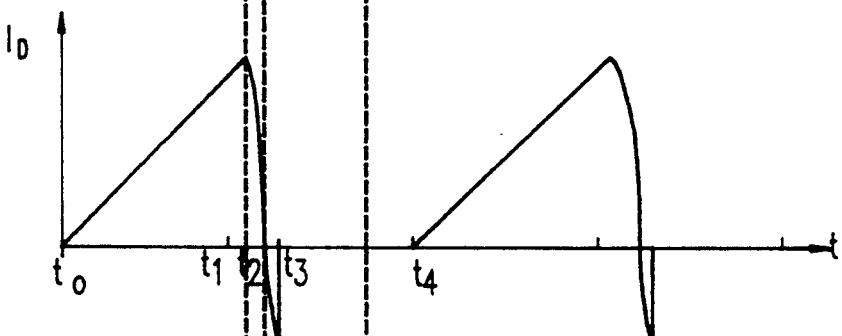
Figure 4D:
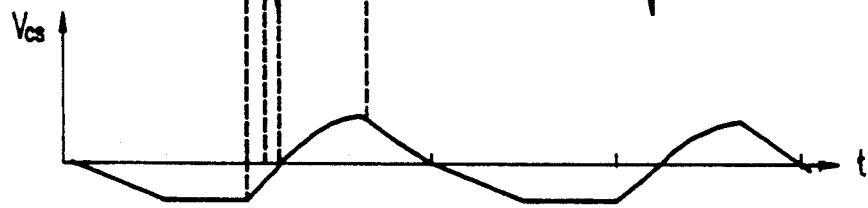
Figure 4E:
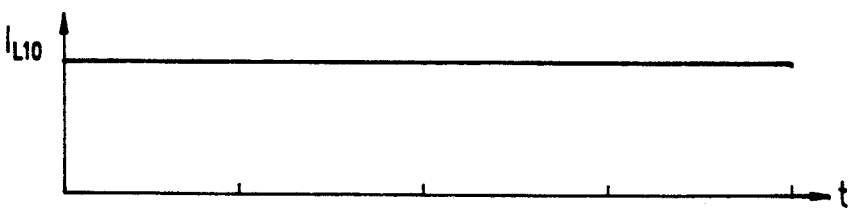

In operation, on turn-on of primary switch 3 at time $t_0$ (cf. FIG. 4(c)), the primary current in the primary winding 6 rises with a constant gradient, which induces constant secondary electromotive force $E_2$ in secondary winding (cf. FIG. 4(b)). Secondary electromotive force $E_2$ generates a secondary current of constant gradient (cf. FIG. 4(c)), the gradient being $(E_2-V_0-V_F)/L_e$, wherein $E_2$ denotes the equivalent electromotive force viewed from load 13, $V_0$ the voltage across load 13, $V_F$ the forward voltage applied to diode 11 and $L_e$ the inductance of inductor 15. Here E is the electromotive force of DC power supply 1, $E_2=(n_2/n_1)E$, and $n_2/n_1$ is the turn ratio of transformer 5.

On turn-off of primary switch at time $t_1$, due to the resonance current (period $2\pi(LpCp)^{\frac{1}{2}}$) generated in primary winding 6, voltage $V_{DS}$ across primary switch 3 rises so as to follow the sine curve of period $2\pi(LpCp)^{\frac{1}{2}}$, where Lp and Cp stand for the leakage inductance of primary winding 6 and the capacitance of resonance capacitor 4, respectively. At the same time a secondary electromotive force of the same period is induced in the reverse direction of secondary winding 7, thus decreasing voltage $V_7$ across secondary winding, as shown in FIG. 4(b). This decrease in voltage $V_7$ causes forward current $I_D$ of diode 11 to decrease until it ceases flowing at time $t_2$.

At time $t_2$, diode 11 turns off, and the secondary resonance circuit is shut off from smoothing circuit 12 except for the current path through inductor 10. In this situations, the electromotive force generated in the reverse direction of secondary winding 7 surpasses the reverse voltage drop in diode 9, so that diode 9 conducts a forward current, thereby allowing the secondary resonance current to flow in the forward direction of diode 9.

FIG. 5 shows an equivalent circuit of the voltage-resonant DC-DC forward converter when the secondary resonance takes place. The resonance proceeds after time $t_2$ through inductance Lp, capacitances Cp and Cs (inductance Le ignored) with the resonance period $T_2=2\pi[Lp\{Cp+(n_2/n_1)^2C_S\}]^{\frac{1}{2}}$. Thus, the slow rises and lowered peaks shown in the time chart of $V_{DS}$ and $V_7$ are attained. When the voltage of capacitor 8 reaches a maximum value, a reverse resonance current is blocked by diode 9, whereby the secondary resonance is stopped, and the charge stored in capacitor 8 is discharged through inductor 10 and supplied to smoothing circuit 12.

It is clear from the above description that during the period $t_1$ to $t_2$ (period I), in which the secondary resonance is blocked, $V_{DS}$ and $V_7$ curves rise following the sine curve of a short period, $T_1=2\pi(LpCp)^{\frac{1}{2}}$, that during the period $t_2$ to $t_3$ (period II), in which secondary resonance takes place, $V_{DS}$ and $V_7$ curves behave as a sine function of long period $T_2$ above except for the transient period, and that during the period $t_3$ to $t_4$, the end of the off-period of primary switch 3 (period III), in which secondary resonance is again blocked, these curves behave as the sine function of short period $T_1$. The short-period behavior of $V_{DS}$ curve in period I and III serves to cause the off-period of primary switch 3 to shorten. The long-period behavior of the $V_{DS}$ curve in period II serves to make the peak of $V_{DS}$ lower, thereby allowing a low-voltage and low-on-resistance switching element to be used for the primary switch.

The snubber circuit of the present embodiment has another advantage. At the beginning of period II, when the forward current in diode 11 stops flowing at $t_2$, a reverse recovery current which is shown in FIG. 4(c) as reverse diode current $I_D$, flows. The reverse recovery current flows in the period $t_2$ to $t_5$, which will be referred to as period IV. Since diode 9 is in the on-state in period IV as described above, voltage $V_7$ is applied reversely across diode 11 through diode 9 and inductor 10. As a result, reverse voltage $V_7$ and the reverse recovery current make a positive power factor, whereby an energy loss occurs. Since the energy loss becomes less as a slope of voltage $V_7$ in period IV is gentle, it follows that the long-period rise (in the reverse direction) of voltage $V_7$, which is the case in the present snubber circuit, is preferable to the short-period rise, which is the case without the snubber circuit.

The advantages of the present snubber circuit are summarized from the aspect of energy conservation in that the surge energy which is to be dissipated in voltage clamping circuit 19 and current snubber circuit 20 of the prior art is, in the present snubber circuit, once stored in capacitor 8 as an electrostatic energy and then supplied through inductor 10 to load 13 in order to be effectively used.

Figure 6:
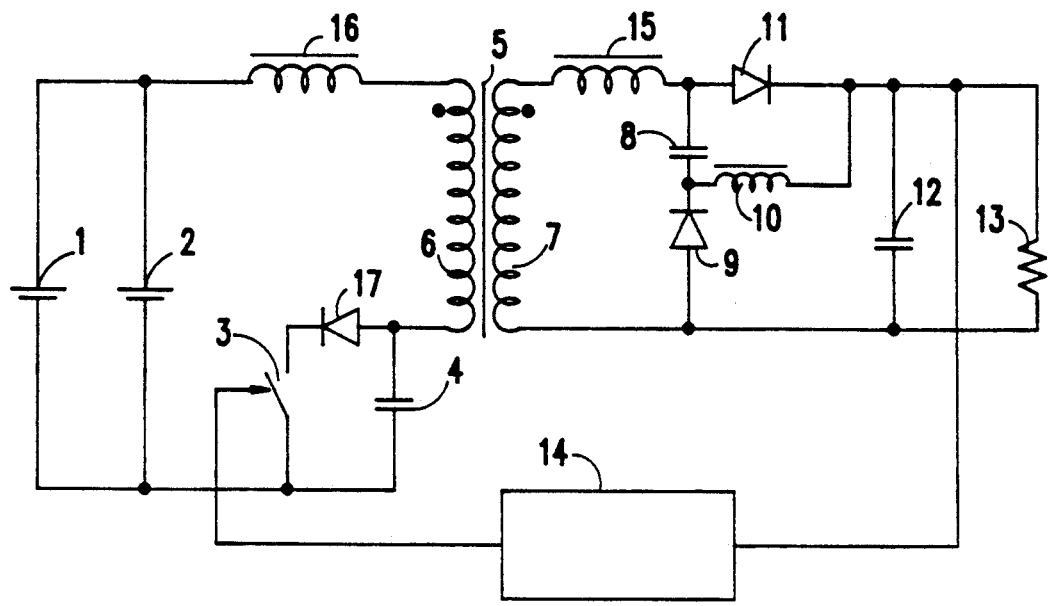
FIG. 6 shows a modified circuit of the converter shown in FIG. 3.
Figure 7:
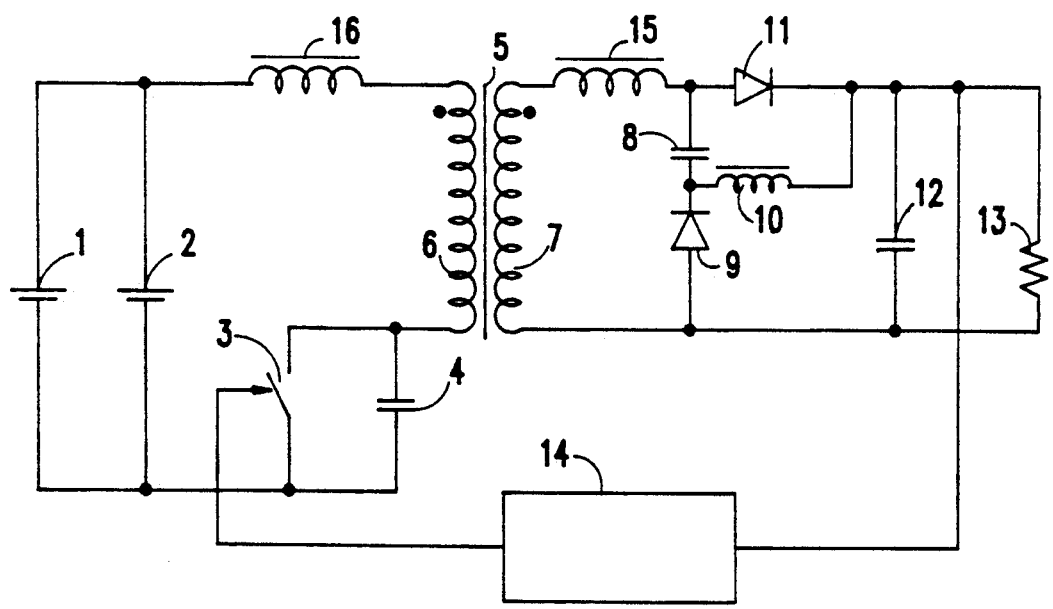
FIG. 7 shows another modified circuit of the converter shown in FIG. 3.

The snubber circuit according to the present invention can be used in the voltage-resonant DC-DC forward converters of both the half-wave type and the full-wave type shown in FIGS. 6 and 7.

Another embodiment will be described below. This embodiment relates to a regulation circuit for regulating one of the multiple output circuits provided in a DC-DC converter.

Figure 8:
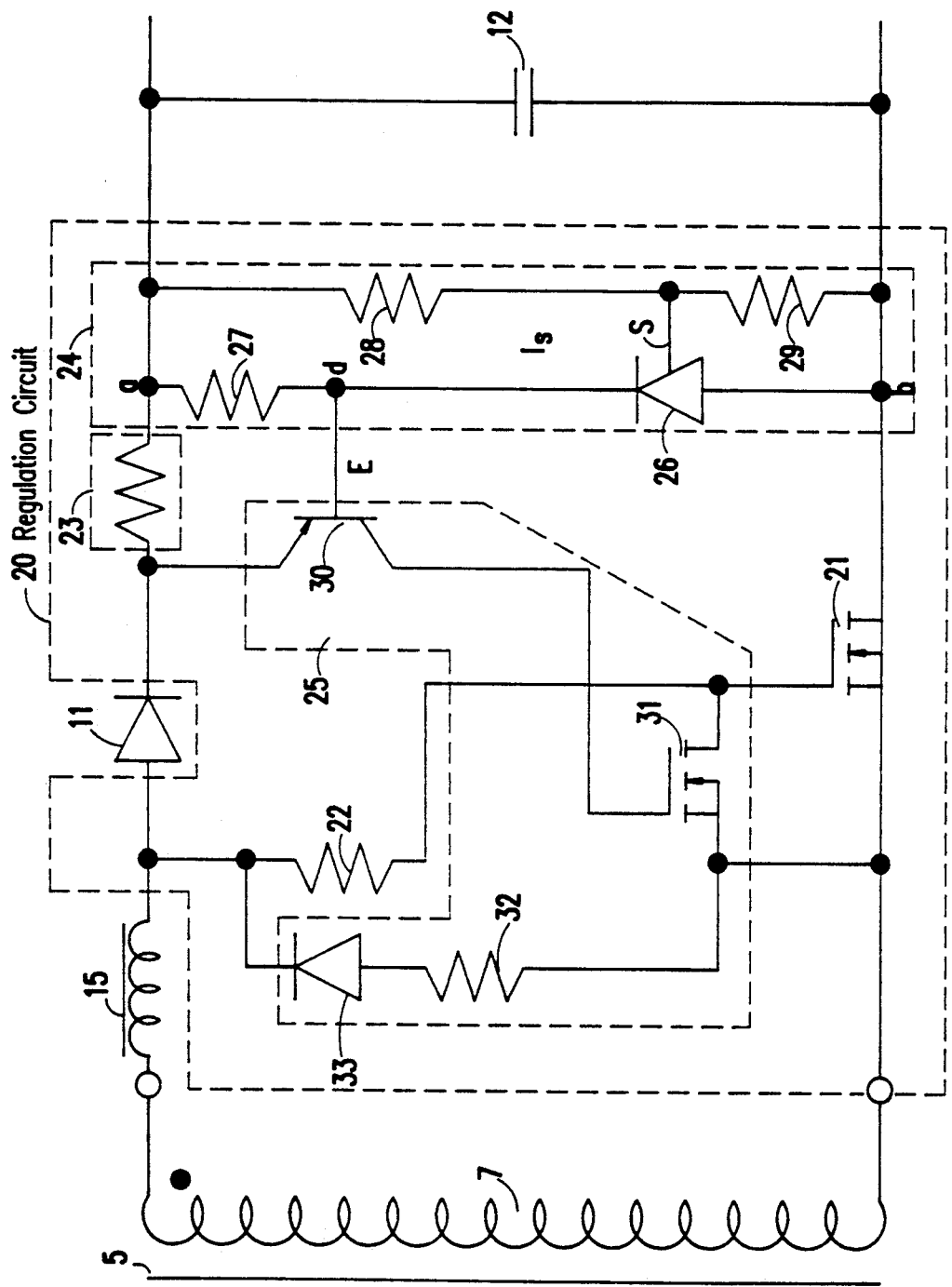
FIG. 8 shows the first embodiment of the regulation circuit according to the present invention.

FIG. 8 represents a regulation circuit provided in an output circuit of a conventional DC-DC forward converter. The output circuit has both rectifier diode 11 connected in a secondary current line of transformer 5 and smoothing circuit 12. In the present embodiment, diode 11 is arranged on the high potential side of the secondary current line. Regulation circuit 20 comprises MOSFET 21 for switching a secondary current of transformer 5, resistor 22 for controlling MOSFET 21 (a first switching control circuit), series dropping resistor 23 (a current-to-voltage converting element), comparator circuit 24 and switching control circuit 25 (a second switching control circuit).

The drain-current path of MOSFET 21 is connected to the low potential side of the secondary current line in series with the load of the output circuit and the gate to the high potential side of the secondary current line through resistor 22. This allows MOSFET 21 to turn on in synchronization with switching-on of the primary switch in the primary circuit of transformer 5. Hereafter, the turn-on time of MOSFET 21 is referred to as time $t_0$.

Series dropping resistor 23, connected in series with the load, is intended for detecting the value of the secondary current supplied to the load. Hereafter, the voltage drop across resistor 23 caused by the secondary current is referred to as a voltage signal. Since the voltage signal at time $t_0$ is null in the present embodiment, the voltage signal at present time t represents the absolute value signal defined above. Comparator circuit 24 has a series connection of shunt regulator element 26 and resistor 27 connected across the output of regulation circuit 20, where resistor 27 is connected with series dropping resistor 23 at point a and shunt regulator element 26 is connected with the low potential side of the secondary current line at point b. Comparator circuit 24 also has voltage dividing resistors 28, 29 which provide shunt regulator element 26 with output signal S corresponding to output voltage $V_0$ applied between points a and b. Shunt regulator element 26 is provided with a constant-voltage supply for reference output signal $S_0$ corresponding to a prescribed output voltage. Shunt regulator element 26 compares output signal S with reference output signal $S_0$, and carries shunt current $I_S$ corresponding to the deviation of output signal S from reference output signal $S_0$. When S equals $S_0$, shunt current $I_S$ takes null deviation value $I_{S0}$. Shunt current $I_S$ establishes voltage $V_S$ across resistor 27. Thus, as deviation $S-S_0$ is large, voltage $V_S$ becomes high, and potential E at junction d between resistor 27 and shunt regulator element 26 becomes low. Hereafter, voltage $V_S$ is referred to as a deviation signal.

Switching control circuit 25 is provided with pnp transistor 30 and N-channel MOSFET 31. Pnp transistor 30 has an emitter connected with the junction of diode 11 and series dropping resistor 23, a base connected with junction d and a collector connected with the gate of MOSFET 31. The source of MOSFET 31 is connected with the low-potential side of the secondary current line, while the drain is connected with the gate of MOSFET 21. Further, switching control circuit 25 is preferably provided with a discharge circuit made up of resistor 32 and diode 33, which serves to discharge an electric charge stored in the input capacitance of MOSFET 31.

In operation, when the primary switch is switched on, the primary current rises linearly with respect to time, thereby inducing a constant electromotive force in the secondary winding during the on-period of the primary switch. Thus, constant voltage $V_7$ is generated in secondary winding 7, as illustrated in FIG. 4(b). Since the gate of MOSFET 21 is biased by voltage $V_7$ through resistor 22, the rise of voltage $V_7$ forces MOSFET 21 to turn on and rectified current $I_D$ to start flowing. Since base-emitter voltage is given by $$V_{BE}=I_D R_D + I_S R_S,\qquad(1)$$

transistor 30 turns on, when the right side of equation (1) exceeds base-emitter threshold voltage $V_{TH}$. Therefore, the threshold value of absolute value signal $I_D R_D$ becomes $$(I_D R_D)_{TH}=V_{TH}-I_S R_S.\qquad(2)$$

Thus, the threshold value of absolute value signal $(I_D R_D)_{TH}$ is a decreasing function of deviation signal $I_S R_S$. Equation (2) may be written in the form $$I_{DTH} R_D = V_{TH} - I_S R_S,\qquad(3)$$

where $I_{DTH}$ denotes the rectified current at time $t_{TH}$ when transistor 30 turns on. As is clear from FIG. 4(c), $I_D$ increases linearly with time t during the on-period. Thus, $I_D$ may be given in the form $$I_D = I_0 + kt.\qquad(4)$$

It follows from equations (3) and (4) that $t_{TH}$ becomes smaller as the deviation signal is large. Accordingly, when the deviation signal is large, transistor 30 turns on early. When transistor 30 turns on, MOSFET 31 turns on, which causes the gate and emitter of MOSFET 21 to be short-circuited, thereby causing MOSFET 21 to be turned off. In this way, a large deviation of the output voltage causes an early turn-off of MOSFET 21, which results in the deviation being lessened.

Figure 9:
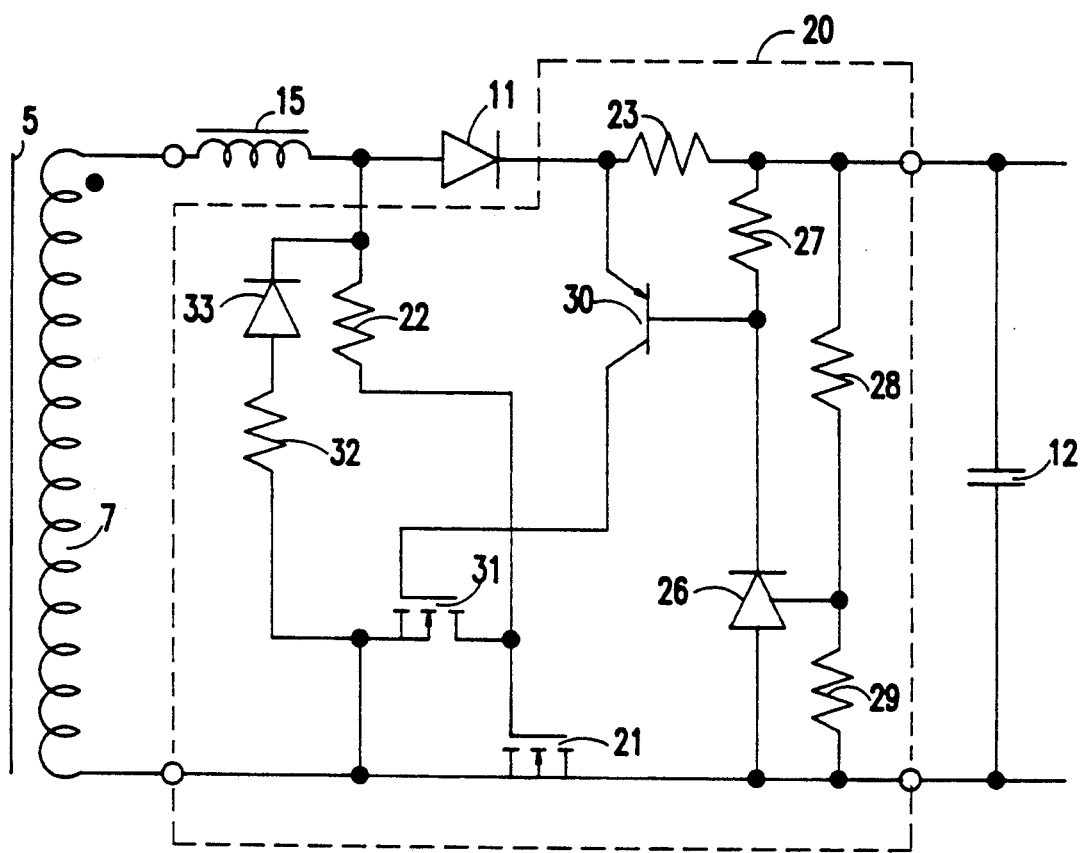
FIG. 9 shows a modification of the regulation circuit shown in FIG. 8.

It is preferable to arrange inductor 15 in the position shown in FIG. 9 rather than in the position shown in FIG. 8. The reason for this is that, in case of FIG. 9, since the gate of MOSFET 21 is connected to secondary winding 7 of main transformer 5 without interposing inductor 15, a higher potential can be applied to the gate, which causes the on-resistance of MOSFET 21 to be lowered, and that, since discharge circuit 32, 33 is directly connected to secondary winding 7, the time constant for the discharge is shortened.

Figure 10:
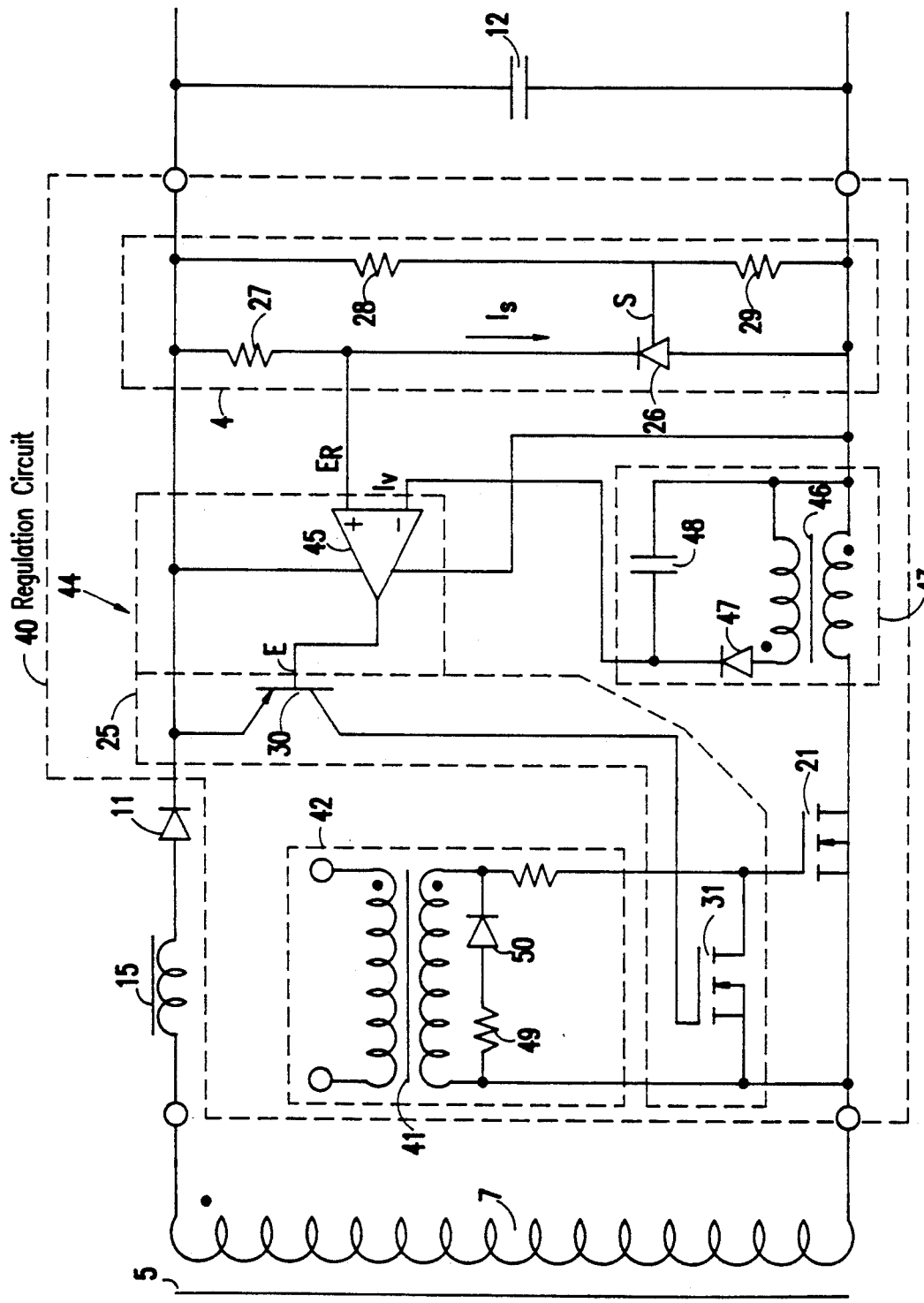
FIG. 10 shows a second embodiment of the regulation circuit according to the present invention.

FIG. 10 represents a second embodiment of the regulation circuit according to the present invention. This embodiment also relates to a regulation circuit in a output circuit of multiple output circuits. Like regulation circuit 20 shown in FIG. 8, the present embodiment comprises switching element 21, switching control circuit 42 (the first switching control circuit), current-to-voltage converting circuit 43, comparator circuit 24 and switching control circuit 44 (the second switching control circuit). Switching control circuit 44 is made up of switching control unit 25 and difference amplifier 45 of voltage gain 1. Among these, switching element 21, comparator circuit 24 and switching control unit 25 are identical with those illustrated in FIG. 8. (The discharge circuit made up of resistor 32 and diode 33 is not shown in FIG. 10.)

Switching control circuit 42 is provided with pulse transformer 41 and a reset circuit made up of resistor 49 and diode 50 connected in series. The reset circuit is arranged for dissipating surge energy in order to reduce a flyback voltage which could be generated in the drive transistor (not shown) in the primary circuit. By virtue of switching control circuit 42, MOSFET 21 can be turned on with a desired phase relation to the switching action of the primary switch. Current-to-voltage converting element 43 is made up of current transformer 46, diode 47 and capacitor 48. Capacitor 48 and the leakage inductance of the secondary winding of current transformer 46 constitutes a one-way resonance circuit in the forward direction of diode 47. Accordingly, the voltage of capacitor 48 varies as the sine function of time t.

However, since the resonance period is long enough compared with the switching period, the voltage of capacitor 48 or voltage signal $I_V$, which corresponds to the primary current of current transformer 46, increases linearly with time. Like the embodiment illustrated in FIG. 8, the secondary current of current transformer 46 is null at time $t_0$. Accordingly, voltage signal $I_V$ at present time t represents the absolute value signal defined above.

The inverted and non-inverted inputs of difference amplifier 45 are $I_V$ and $V_0 - I_S R_S$, respectively, where $V_0$, $I_S$ and $R_S$ are the output voltage of the output circuit, the shunt current and the resistance of resistor 27, respectively. The output of difference amplifier 45 is $V_0 - (I_S R_S + I_V)$. Thus, base-emitter voltage $V_{BE}$ of transistor 30 is $-(I_S R_S + I_V)$, which is similar to $-(I_S R_S + R_D I_D)$ in FIG. 8. Consequently, transister 30 acts quite similarly to that in FIG. 8.

Figure 11A:
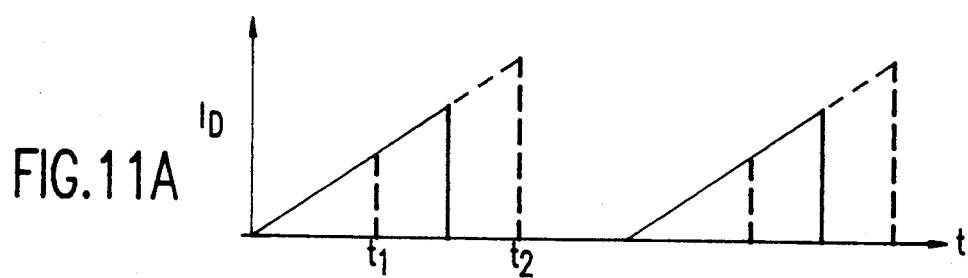
FIG. 11(a)-(b) shows time charts of rectified current $I_D$ illustrating the operations of the first and second regulation circuits.
Figure 11B:
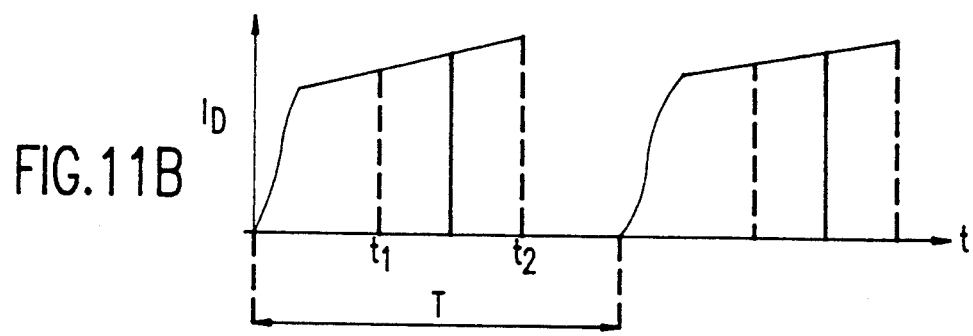

FIG. 11 shows time charts of the rectified currents delivered from the regulation circuits. FIG. 11(a) represents rectified current $I_D$, in the case that the resonance in the primary circuit is brought about by leakage inductance of transformer 5 and resonance capacitor 4 (case (a)), while FIG. 11(b) represents the rectified current $I_D$, in the case that the resonance is brought about by externally attached inductor 2 and resonance capacitor 4 (case (b)). The solid and broken lines in FIG. 11 represent the rectified currents delivered from regulation circuits 20 and 40, respectively.

In the case that regulation circuit 20 is employed, MOSFET switch 21 turns on in synchronization with the rise of the electomotive force induced in the secondary winding, and at the same time the secondary current starts flowing. If all the inductors provided in the primary circuit of transformer 5 are reset in the off-period of primary switch 3, i.e. if the magnetic energy stored in all inductors during the preceding on-period is dissipated in the current off-period, the secondary current will rise from zero in the next on-period, as in FIG. 11(a) above. Conversely, if the magnetic energy stored in the inductors during the preceding on-period remains undissipated before the current off-period ends, the primary current will rise rapidly at the beginning of the next on-period, which will cause a rapid rise in the secondary current, as in FIG. 11(b). Further, due to resonance brought about by inductor 2 and capacitor 4, the rise of the secondary current, thus rectified current $I_D$, follows a sine curve, as seen in FIG. 11(b).

In the case that regulation circuit 40 is employed, the secondary current, or rectified current $I_D$, can start flowing in synchronization with any desired synchronizing signal by virtue of switching control circuit 42, as drawn by broken lines, and stop flowing by the preferential control of switching control unit 25, when the output of difference amplifier 45 exceeds the base-emitter threshold voltage of transistor 30.

Rectified current $I_D$, as is known in the art, rises linearly with respect to time during the on-period of the primary switch. Let $I_0$ be a initial current, i.e. rectified current $I_D$ at the time when the primary switch turns on, and k be a gradient of rectified current $I_D$ with respect to t, then $$I_d = I_0 + kt, \quad (5)$$

As described with regard to FIG. 4(c), $$k = (E_2 - V_0 - V_F)/Le. \quad (6)$$

The power supplied from the regulation circuit to the load is given by $$P = f \int I_D V_0 \, dt, \quad (7)$$

f being the switching frequency, $V_0$ the output voltage and the integration being taken through the period from time $t_1$ to time $t_2$. Since $V_0$ is substantially constant, equation (7) gives $$P = \frac{1}{T_{ON} + T_{OFF}} V_0 S, \quad (8)$$

$$= \frac{V_0}{2(T_{ON} + T_{OFF})} (I_{D1} + I_{D2})(t_2 - t_1), \quad (9)$$

where S stands for the area of the $I_D - t$ plane between times $t_1$ and $t_2$. In equation (9), since $I_{D2}$ and $t_2$ are automatically selected by switching control circuit 25 depending on deviation signal E, and since $I_{D1}$ is determined depending on $t_1$ by using equation (5), power P is regulated to minimize the deviation in output voltage $V_0$.

Figure 12:
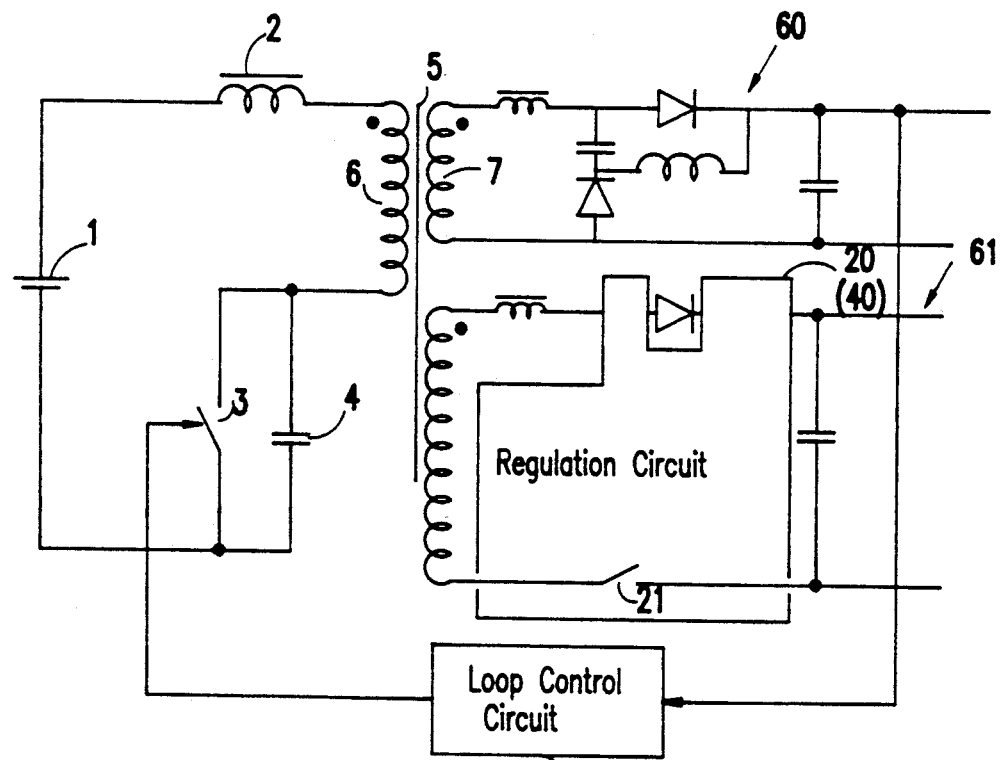
FIG. 12 shows an embodiment of the voltage-resonant DC-DC forward converter with the multiple outputs, wherein the snubber circuit shown in FIG. 3 is provided in the main output circuit, and the regulation circuit shown in FIG. 8

FIG. 12 shows an application of the present invention. This embodiment is a combination of the snubber circuit in FIG. 3 and regulation circuit 20 or 40. The converter is a single-ended voltage-resonant DC-DC forward converter provided with two output circuits. Main output circuit 60 has the snubber circuit illustrated in FIG. 3. The output of main output circuit is fed back through loop-control circuit 14 to control switching of primary switch 3. Auxiliary output circuit 61 is provided with regulation circuit 20 or 40 shown in FIGS. 8 and 10, by which the output is regulated independent of main output circuit 60.

Figure 13:
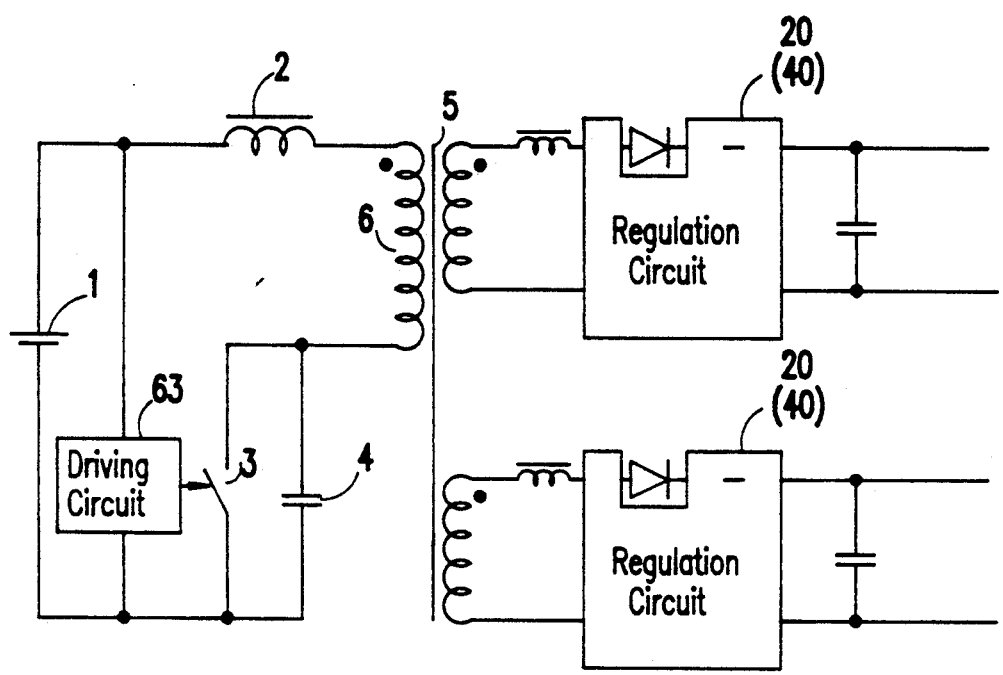
FIG. 13 shows an embodiment of the voltage-resonant DC-DC forward converter with the multiple outputs, wherein the primary switch is driven independently of output circuits and each output circuit is regulated by its own regulation circuit.

FIG. 13 shows another application of the present invention. In this embodiment driving circuit 63 for driving primary switch 3 is provided in the primary circuit of transformer 5 separated from the multiple output circuits. Each of the multiple output circuits has its own regulation circuit 20 or 40 as set forth above, and supplies an output regulated independently of any other circuits.

It is to be understood that although the characteristics and advantages of the present invention have been set forth in the foregoing description, the disclosure is illustrative only, and changes may be made in arrangement of parts within the scope of the appended claims.

What we claim is:

1. A voltage-resonant DC-DC forward converter provided with snubber means in a secondary circuit, the snubber means comprising a series connection of a first capacitor and a first diode connected to both ends of a secondary winding of a main transformer in the converter to make up a loop of a secondary resonance circuit which allows a secondary resonance current to flow in a forward direction of the first diode, the forward direction being so directed that the first diode blocks the secondary resonance current from flowing at least while the secondary winding supplies a secondary current to a smoothing circuit through a second diode for rectifying the secondary current.

2. A voltage-resonant DC-DC forward converter as claimed in claim 1, wherein the first diode blocks the secondary resonance current both while the secondary winding supplies a secondary current to the smoothing circuit through the second diode and while a second capacitor for the voltage-resonant switching discharges.

3. A voltage-resonant DC-DC forward converter as claimed in claim 1, wherein the converter further includes discharge means which, while the first diode blocks the secondary resonance current, discharges a charge stored in the first capacitor.

4. A voltage-resonant DC-DC forward converter provided with snubber means in a secondary circuit, the snubber means comprising a series connection of a first capacitor and a first diode connected to both ends of a secondary winding of a main transformer in the converter to make up a loop of a secondary resonance circuit which allows a secondary resonance current to flow in a forward direction of the first diode, the forward direction being so directed that the first diode blocks the secondary resonance current from flowing at least while the secondary winding supplies a secondary current to a smoothing circuit through a second diode for rectifying the secondary current, wherein the capacities of the first capacitor is determined so that it lowers the peak of the voltage applied to a primary switch for the voltage-resonant switching to a lowest possible height under the condition that turn-off period of the primary switch is not lengthened beyond a predetermined length.

5. A voltage-resonant DC-DC forward converter provided with snubber means in a secondary circuit, the snubber means comprising a series connection of a first capacitor and a first diode connected to both ends of a secondary winding of a main transformer in the converter to make up a loop of a secondary resonance circuit which allows a secondary resonance current to flow in a forward direction of the first diode, the forward direction being so directed that the first diode blocks the secondary resonance current from flowing at least while the secondary winding supplies a secondary current to a smoothing circuit through a second diode for rectifying the secondary current, wherein the converter further includes discharge means which, while the first diode blocks the secondary resonance current, discharges a charge stored in the first capacitor, and wherein the discharge means is an inductor connected between a junction of the first capacitor and first diode and the smoothing circuit.

6. A voltage-resonant DC-DC forward converter as claimed in claim 5, wherein an inductance of the inductor is determined so that the magnitude of the time constant associated with the first capacitor and the inductor is of an order of the average switching period of the primary switch for the voltage-resonant switching.

7. A DC-DC converter provided with multiple outputs, at least one of a output circuits including a regulation means for regulating the output of the output circuit, the regulation means comprising switching means for switching a secondary current of a main transformer, first switching control means for controlling the switching means to take a first switching state with a predetermined phase relation to the switching action of a primary switch, current-to-voltage converting means for generating a voltage signal which varies as a secondary current, comparator means for providing a deviation signal corresponding to a deviation of the output voltage of the output circuit from a prescribed value, and second switching control means for controlling the switching means to take a second switching state when an absolute value of a difference between the existing voltage signal and the first voltage signal varies beyond a threshold value which is dependent on the deviation signal, the first voltage signal being a voltage signal generated when the switching means goes to the first switching state.

8. A DC-DC converter as claimed in claim 7, wherein the threshold value is a decreasing function of the deviation signal.

9. A DC-DC converter as claimed in claim 8, wherein the sum of the threshold value and the deviation signal is equal to a predetermined constant.

10. A converter as claimed in claim 9, wherein the second switching control means includes a transistor, a sum of the deviation signal and the absolute value being applied between the base and the emitter thereof and the predetermined constant being the base-emitter threshold voltage of the transistor.

11. A converter as claimed in claim 10, wherein the converter is a DC-DC forward converter, the first and second switching states are the on and off states, respectively, and the second switching control means further includes sum means for summing up the deviation signal and the absolute value, the output of the sum means causing the transistor to be turned on when the output exceeds the base-emitter threshold voltage, thereby causing the switching means to be turned off.

12. A converter as claimed in claim 7, wherein the primary switch is driven by driving means independently of any output circuits.

* * * * *